United States Patent
Guo et al.

(10) Patent No.: US 11,983,500 B2
(45) Date of Patent: May 14, 2024

(54) METHOD AND DEVICE FOR SEMANTIC ANALYSIS AND STORAGE MEDIUM

(71) Applicant: BEIJING XIAOMI PINECONE ELECTRONICS CO., LTD., Beijing (CN)

(72) Inventors: Yuankai Guo, Beijing (CN); Yulan Hu, Beijing (CN); Liang Shi, Beijing (CN); Erli Meng, Beijing (CN); Bin Wang, Beijing (CN); Yingzhe Wang, Beijing (CN); Shuo Wang, Beijing (CN); Xinyu Hua, Beijing (CN)

(73) Assignee: BEIJING XIAOMI PINECONE ELECTRONICS CO., LTD., Beijing (CN)

(*) Notice: Subject to any disclaimer, the term of this patent is extended or adjusted under 35 U.S.C. 154(b) by 346 days.

(21) Appl. No.: 17/334,924

(22) Filed: May 31, 2021

(65) Prior Publication Data

US 2022/0171940 A1    Jun. 2, 2022

(30) Foreign Application Priority Data

Dec. 2, 2020   (CN) .......................... 202011401136.5

(51) Int. Cl.
*G06F 40/30* (2020.01)
*G06F 40/20* (2020.01)

(52) U.S. Cl.
CPC .............. *G06F 40/30* (2020.01); *G06F 40/20* (2020.01)

(58) Field of Classification Search
CPC ........... G06F 40/00; G06F 40/20; G06F 40/30
See application file for complete search history.

(56) References Cited

U.S. PATENT DOCUMENTS

| 4,661,924 A | 4/1987 | Okamoto et al. |
| 2005/0119883 A1* | 6/2005 | Miyazaki ................. G10L 15/32 704/231 |

(Continued)

FOREIGN PATENT DOCUMENTS

CN    106681981 A  *  5/2017  .........  G06F 16/3346

OTHER PUBLICATIONS

Daniel Jurafsky et al: "Speech and Language Processing Part-of-Speech Tagging", Oct. 2, 2019 (Oct. 2, 2019), XP055859284, Retrieved from the Internet: URL:https://web.archive.org/web/20201108110922if_/https://web.stanford.edu/jurafsky/slp3/8.pdf, retrieved on Nov. 9, 2021,(28p).

(Continued)

*Primary Examiner* — Daniel C Washburn
*Assistant Examiner* — Sean E Serraguard
(74) *Attorney, Agent, or Firm* — Arch & Lake LLP

(57) ABSTRACT

At a terminal equipment side, sentence information received by the terminal equipment is acquired. A part-of-speech label sequence of text data in the sentence information for which part-of-speech labelling is to be performed is extracted. A detection result is acquired by detecting legitimacy of the part-of-speech label sequence. When the detection result indicates that the part-of-speech label sequence is illegitimate, the part-of-speech label sequence is corrected. A corrected part-of-speech label sequence is output as a result of performing part-of-speech labelling on the text data. Semantics corresponding to the sentence information is determined according to output sentence information with part-of-speech labels.

15 Claims, 6 Drawing Sheets

(56) References Cited

U.S. PATENT DOCUMENTS

| | | | |
|---|---|---|---|
| 2011/0161067 A1 | 6/2011 | Lesher et al. | |
| 2015/0039295 A1* | 2/2015 | Soschen | G06F 40/205 |
| | | | 704/9 |
| 2017/0345412 A1* | 11/2017 | Mitsui | G10L 13/07 |
| 2019/0073351 A1* | 3/2019 | Zhang | G06N 3/084 |
| 2020/0097549 A1 | 3/2020 | Parng et al. | |
| 2021/0004441 A1* | 1/2021 | Sapugay | G06F 40/30 |

OTHER PUBLICATIONS

European Search Report in the European application No. 21176667.0, dated Nov. 18, 2021,(11p).

* cited by examiner stack detection
---
array: label sequence, s:stack
1: function STACKDETECT(*array, s*)
2:    $s \leftarrow []$
3:    for $i = 0,1,2,...,T$ do
4:       $s \leftarrow (array(i))$
5:       if $i == 0$ & *isIllegalStart(array(0))* then
6:          *adjust(i)*
7:          *continue*
8:       end if
9:       if *isIllegal(s)* then
10:         *transitionProbabilityAdjust(s)*
11:      end if
12:   end for
13:   *return array*
14: end function

FIG. 4

METHOD AND DEVICE FOR SEMANTIC ANALYSIS AND STORAGE MEDIUM

CROSS-REFERENCE TO RELATED APPLICATIONS

This application claims the priority to Chinese Application No. 202011401136.5 filed on Dec. 2, 2020. The disclosure of the Chinese Application is hereby incorporated by reference in its entirety for all purposes.

BACKGROUND

A mode of human-computer interaction receives extensive attention. The entire Internet industry is actively exploring possible mode and scene for applying human-computer interaction. In a scene of human-computer interaction, in order for a machine to better understand a natural language, the natural language may have to be provided with part-of-speech labels. As a basic task in natural language processing, part-of-speech labelling is a text data processing technology where a word in a corpus is labelled with a part of speech according to the meaning and the context of the word. In an era of deep learning, many models have emerged to implement part-of-speech labelling, which may output a result of part-of-speech labelling.

SUMMARY

The present disclosure provides a method and device for semantic analysis, and a storage medium.

According to an aspect of examples of the present disclosure, there is provided a method for semantic analysis. The method is applied to terminal equipment, and includes:
acquiring sentence information received by the terminal equipment;
extracting a part-of-speech label sequence of text data in the sentence information for which part-of-speech labelling is to be performed;
acquiring a detection result by detecting legitimacy of the part-of-speech label sequence;
in response to the detection result indicating that the part-of-speech label sequence is illegitimate, correcting the part-of-speech label sequence;
outputting a corrected part-of-speech label sequence as a result of performing part-of-speech labelling on the text data; and
determining semantics corresponding to the sentence information according to output sentence information with part-of-speech labels.

According to an aspect of examples of the present disclosure, there is provided a device for semantic analysis, including:
a processor; and
a memory for storing processor executable instructions.

The processor is configured to implement any method of the first aspect by executing the executable instructions stored in the memory.

According to an aspect of examples of the present disclosure, there is provided a non-transitory computer-readable storage medium having stored therein computer-executable instructions which, when executed by a processor, implement a step of any method of the first aspect.

It should be understood that the general description above and the detailed description below are exemplary and explanatory only, and do not limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

FIG. 4 is a pseudo code for stack detection according to an illustrative example.

DETAILED DESCRIPTION

Figure 1:
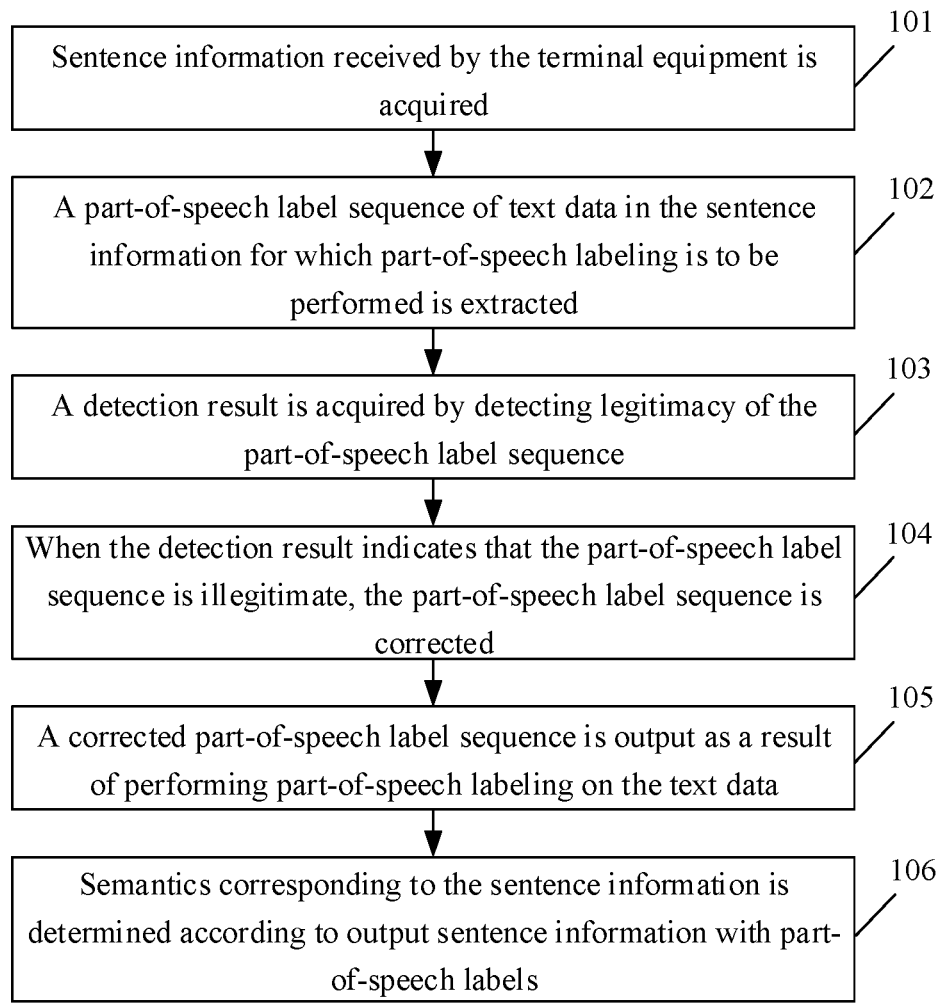
FIG. 1 is a flowchart 1 of a method for semantic analysis according to an illustrative example.

Reference will now be made in detail to illustrative examples, examples of which are illustrated in the accompanying drawings. The following description refers to the accompanying drawings in which the same numbers in different drawings represent the same or similar elements unless otherwise represented. The implementations set forth in the following description of illustrative examples do not represent all implementations consistent with the present disclosure. Instead, they are merely examples of devices and methods consistent with aspects related to the present disclosure. The illustrative implementation modes may take on multiple forms, and should not be taken as being limited to examples illustrated herein. Instead, by providing such implementation modes, examples herein may become more comprehensive and complete, and comprehensive concept of the illustrative implementation modes may be delivered to those skilled in the art. Implementations set forth in the following illustrative examples do not represent all implementations in accordance with the subject disclosure. Rather, they are merely examples of the apparatus and method in accordance with certain aspects of this disclosure.

Note that although a term such as first, second, third may be adopted in an example herein to describe various kinds of information, such information should not be limited to such a term. Such a term is merely for distinguishing information of the same type. For example, without departing from the scope of the examples herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of examples herein. However, those skilled in the art will know that the technical solutions of examples herein may be carried out without one or more of the details; alternatively, another method, component, device, option, etc., may be adopted. Under other conditions, no detail of a known structure, method, device, implementation, material or operation may be shown or described to avoid obscuring aspects of examples herein.

Sometimes, with the development of society, additional parts of speech will be produced imperceptibly for many words. For part-of-speech labelling, regardless of whether it is for Chinese or English, the difficulty lies in variability of the part of speech of a word in different contexts. This makes semantic analysis inaccurate.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

Examples of the present disclosure provide a method for semantic analysis. FIG. 1 is a flowchart 1 of a method for semantic analysis according to an illustrative example. As shown in FIG. 1, the method includes steps as follows.

In S101, sentence information received by the terminal equipment is acquired.

In S102, a part-of-speech label sequence of text data in the sentence information for which part-of-speech labelling is to be performed is extracted.

In S103, a detection result is acquired by detecting legitimacy of the part-of-speech label sequence.

In S104, when the detection result indicates that the part-of-speech label sequence is illegitimate, the part-of-speech label sequence is corrected.

In S105, a corrected part-of-speech label sequence is output as a result of performing part-of-speech labelling on the text data.

In S106, semantics corresponding to the sentence information is determined according to output sentence information with part-of-speech labels.

In examples of the present disclosure, the method for semantic analysis may be applied to any mobile terminal, and the mobile terminal may be: a smart phone, a tablet computer, a smart voice speaker, or a wearable electronic equipment, etc.

Examples of the present disclosure may be applied to any scene that requires human-computer interaction, such as a voice interaction scene based on a smart voice speaker. In this scene, after acquiring a voice signal, a smart voice speaker may have to recognize the voice signal, understand the semantics, and then provide an answer. In order to understand the semantics of the speech signal more accurately, after identifying the sentence information in the speech signal, the method for semantic analysis described above is used to determine the semantics corresponding to the sentence information.

As another example, the present disclosure may be applied to a consultation scene based on a human-machine dialogue, that is, a text dialogue scene. After a mobile terminal receives sentence information, it may have to analyze the sentence information in order to understand the semantics and then provide an answer.

Semantics may represent meaning or intention of sentence information.

Here, after receiving sentence information, a terminal equipment extracts a part-of-speech label sequence of text data in the sentence information. The extraction of the part-of-speech label sequence of the text data may be implemented based on a preset extraction model. The preset extraction model is a part-of-speech labelling model. The specific implementation is described below.

Text data refers to data containing words, letters, and/or symbols. In some examples, the text data may be a sentence composed of words, letters, and/or symbols.

By performing part-of-speech labelling on text data, an appropriate part-of-speech label is attached to each word in a sentence.

The part-of-speech label represents the part-of-speech of each word. Here, the part of speech of a word is determined by the word's meaning, form and grammatical function in the language to which the word belongs.

A part of speech may include a classification used to indicate the nature of a word, such as a verb, a noun, or an adjective, etc. For example, if the word "me/us" is a pronoun, the part-of-speech label for "me/us" is r. The word "love" is a verb, and the part-of-speech label for "love" is v. The word "Beijing" is a noun, and the part-of-speech label for "Beijing" is ns. The word "Tiananmen" is a noun, and the part-of-speech label of "Tiananmen" is ns.

Part-of-speech labelling may be a matter of classification, where words in a corpus are classified according to their part-of-speeches. Whether a word is labelled with a correct part of speech may directly affect the subsequent syntactic analysis and semantic analysis.

Here, since the part-of-speech labelling is directed at a single word, before performing the formal part-of-speech labelling, a sentence composed of words, letters, and/or symbols may have to be segmented into separate words, and then part-of-speech labelling may be performed on the words.

The part-of-speech label sequence refers to a label sequence acquired by processing text data based on a part-of-speech labelling model. The label sequence is composed of a combination of parts of speech of words in the text data in the order in which the words are arranged.

Take the text data "Beijing is the capital of China" as an example. First, "Beijing is the capital of China" is segmented into individual words: "Beijing", "is", "capital", "of", and "China". Then, the part-of-speech label of each word is determined as: Beijing/ns, is/v, capital/n, of/u, China/ns. Then, the part-of-speech labels are combined according to the order in which the words are arranged to acquire a label sequence of: Beijing/ns, is/v, capital/n, of/u, China/ns.

Here, the process of word segmentation and determining the part-of-speech label of each word, and then combining the part-of-speech labels to acquire the part-of-speech label sequence, may be implemented based on a preset part-of-speech labelling model. That is, in S102, the part-of-speech label sequence of the text data for which part-of-speech labelling is to be performed may be extracted as follows. The part-of-speech label sequence may be acquired by performing, based on a preset part-of-speech labelling model, labelling processing on the text data for which part-of-speech labelling is to be performed.

The part-of-speech labelling model may be any neural network model such as a Hidden Markov Model (HMM), a Long Short-Term Memory (LSTM), a maximum entropy model, or a decision-tree-based model, etc.

The part-of-speech labelling model may be used as follows. Text data having gone through word segmentation processing and word-to-vector coding are input into a part-of-speech labelling model (such as an LSTM model), acquiring an emission probability of the each word with respect to each part-of-speech label. Then, the emission probability is input into a conditional random field network, outputting a final part-of-speech label of each word. In order to further improve the accuracy of labelling, a bilateral LSTM model may also be replaced with another model with powerful feature extraction capability, further improving the effect of labelling. In this way, a part-of-speech labelling model may be deemed as consisting of a powerful feature extractor followed by a decoder (such as conditional random field, CRF, or a classifier Softmax), such as BiLSTM+CRF or BiLSTM+Softmax.

In this way, in some examples, the part-of-speech label sequence of the text data in the sentence information for which part-of-speech labelling is to be performed may be extracted as follows.

Feature extraction may be performed on each word contained in the text data based on a preset extraction model, acquiring an emission probability of the each word with respect to each part-of-speech label.

The part-of-speech label sequence of the text data may be acquired according to the emission probability and an order in which the each word in the text data is arranged.

Here, the preset extraction model is a part-of-speech labelling model.

The emission probability acquired by processing the text data by the preset part-of-speech labelling model refers to the probability of a word in the text data having a part-of-speech label.

It should be noted that the part-of-speech types of words, or the number of part-of-speech labels, may be preset. For example, in some examples, there may be 42 types of parts of speech of words, that is, there may be 42 parts of speech, such as verb, noun, adjective, etc. After processing the text data with a preset part-of-speech labelling model, probabilities of each word in the text data corresponding respectively to the 42 part-of-speech labels may be acquired. That is, the probability of "Beijing" being a verb is A, the probability of "Beijing" being a noun is B, the probability of "Beijing" being an adjective is C, and so on. Probabilities of "Beijing" with respect to the 42 part-of-speech labels may be acquired. Here, the sum of the probabilities of "Beijing" with respect to the 42 part-of-speech labels is 1, that is, A+B+C+ . . . =1.

It should also be noted that as a phrase contains at least 2 words, and the words are arranged in an order, in addition to indicating the parts of speech of the words, further labelling may be implemented through locations of the words. For example, according to a BI labelling rule, the part-of-speech labels of the word "Beijing" should be: Bei/B-ns plus jing/I-ns.

Here, the label set of the BI labelling rule is {B, I}, the beginning of the word is labelled with B, and a remaining location of the word is labelled with I.

Then, in joint labelling based on the part of speech and the location of a word, probabilities of each word in the text data with respect to the 42*2=84 part-of-speech labels may have to be acquired.

A part-of-speech label sequence acquired by labelling based on the part-of-speech labelling model may be problematic. For example, according to the BI labelling rule, the part-of-speech labels of the word "Beijing" should be: Bei/B-ns plus jing/I-ns. However, taking an illegitimate situation as an example, the part-of-speech labelling model may mistakenly label "Bei" with "I-ns" when computing probabilities of each word with respect to respective part-of-speech labels. Then, the output part-of-speech label sequence may cause a problem in subsequent identification processing.

In view of this, with examples of the present disclosure, legitimacy detection is performed on the part-of-speech label sequence processed by the part-of-speech labelling model, and it is determined whether to perform a correction step based on the detection result. If the detection result indicates that the part-of-speech label sequence is illegitimate, the part-of-speech label sequence is corrected, and the corrected part-of-speech label sequence is output as the result of performing part-of-speech labelling on the text data, ensuring accuracy of the output part-of-speech labels.

In addition, since the legitimacy detection is performed directly on the part-of-speech label sequence processed based on the part-of-speech labelling model, there is no need to change the structure of the original model, which also saves operating costs.

Here, in one example, the legitimacy of the part-of-speech label sequence may be detected, acquiring the detection result, as follows. Legitimacy of the part-of-speech label sequence may be detected through a preset standard rule, acquiring the detection result. That is, a set of standard rules for part-of-speech labels may be set first, and the part-of-speech label sequence processed by the part-of-speech labelling model is verified by using the standard rules, acquiring the detection result indicating whether the part-of-speech label sequence is legitimate.

In another example, the legitimacy of the part-of-speech label sequence may be detected, acquiring the detection result, as follows. The legitimacy of the part-of-speech label sequence may be detected through a preset illegitimate sequence, acquiring the detection result. That is, an illegitimate sequence is determined first, and then the part-of-speech label sequence processed by the part-of-speech labelling model is verified through the illegitimate sequence.

It should be noted that for different text data of different content, different part-of-speech label sequences may appear, and it is generally difficult to determine standard rules that apply to all or most text data. In contrast, different text data may generally correspond to the same or similar illegitimate sequences. Therefore, the legitimacy of a part-of-speech label sequence may be detected based on an illegitimate sequence.

In the legitimacy detection based on an illegitimate sequence, in S102, the detection result may be acquired by detecting the legitimacy of the part-of-speech label sequence as follows.

In S1021, the part-of-speech label sequence may be compared to a preset label sequence, acquiring a comparison result. The preset label sequence may be an illegitimate sequence of part-of-speech labels.

In S1022, the detection result indicating whether the part-of-speech label sequence is legitimate may be acquired according to the comparison result.

Here, the preset label sequence may be an illegitimate sequence of part-of-speech labels. The illegitimate sequence may be determined based on a labelling rule and a feature of the text data.

Taking a BI labelling rule as an example, an illegitimate sequence may be as summarized as follows.

(1) A sequence may be illegitimate when the part-of-speech label of a word therein starts with "I-".

In the example, the "Bei" in "Beijing" is labelled with "I-", and "Bei" is the first word, the part-of-speech label of which should not be "I-".

(2) A sequence may be illegitimate when for a word therein with more than 1 character, "B-" appears in the part-of-speech label of a character of the word after the first character.

Since in the BI marking rule, the beginning character of a word should be labelled with B, and a remaining character of the word should be labelled with I, then a character after the first character should be labelled with "I-".

(3) A sequence may be illegitimate when characters within a word therein correspond to inconsistent types of part-of-speech labels.

For example, "Bei" is labelled with "B-ns" and "jing" is labelled with "I-n"; here, "ns" means a place, and "n" means noun. The "n" or "ns" may be used for both characters.

With example of the present disclosure, an illegitimate situation is summarized into an illegitimate sequence. The acquired part-of-speech label sequence is compared to the illegitimate sequence, and it is determined whether the part-of-speech label sequence is legitimate according to the comparison result. When the situation exists in the part-of-speech label sequence processed by the part-of-speech labelling model, it may be deemed that there is a labelling error in the part-of-speech label sequence.

Here, when a label identical to an illegitimate sequence appears in the part-of-speech label sequence, it is deemed that the part-of-speech label sequence is illegitimate.

When no label identical to an illegitimate sequence appears in the part-of-speech label sequence, it is deemed that the part-of-speech label sequence is legitimate.

In this way, legitimacy of the part-of-speech label sequence is verified through an illegitimate sequence, which is more in line with an actual labelling requirement, and the verification result minimizes the possibility of misjudgment.

Figure 2:
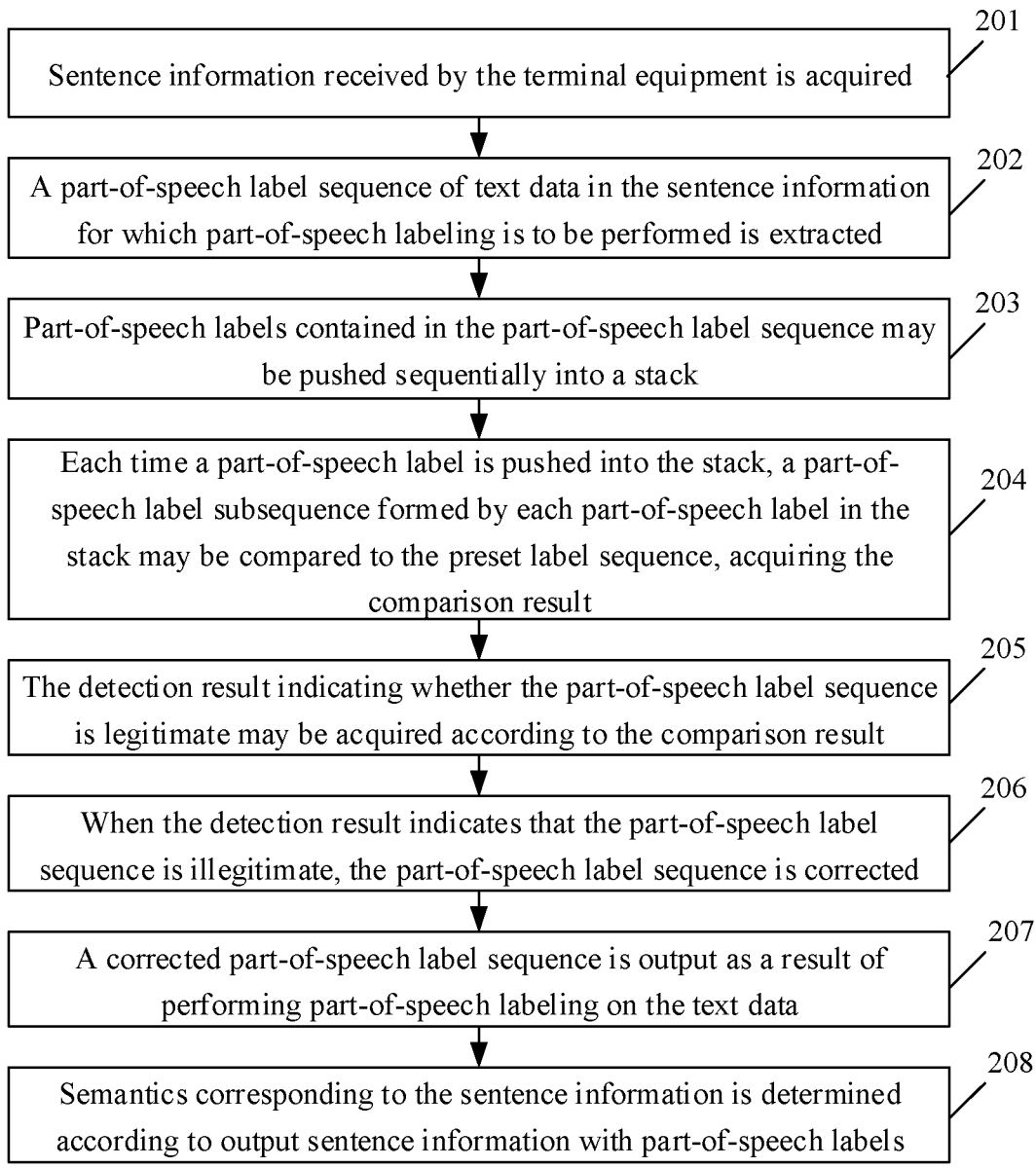
FIG. 2 is a flowchart 2 of a method for semantic analysis according to an illustrative example.

The present disclosure also provides an example of a method for semantic analysis. FIG. 2 is a flowchart 2 of a method for semantic analysis according to an illustrative example. As shown in FIG. 2, the method for semantic analysis may include steps as follows.

In S201, sentence information received by the terminal equipment is acquired.

In S202, a part-of-speech label sequence of text data in the sentence information for which part-of-speech labelling is to be performed is extracted.

In S203, part-of-speech labels contained in the part-of-speech label sequence may be sequentially pushed into a stack.

In S204, when a part-of-speech label is pushed into the stack, a part-of-speech label subsequence formed by each part-of-speech label in the stack may be compared to the preset label sequence, acquiring the comparison result.

In S205, the detection result indicating whether the part-of-speech label sequence is legitimate may be acquired according to the comparison result.

In S206, when the detection result indicates that the part-of-speech label sequence is illegitimate, the part-of-speech label sequence is corrected.

In S207, a corrected part-of-speech label sequence is output as a result of performing part-of-speech labelling on the text data.

In S208, semantics corresponding to the sentence information is determined according to output sentence information with part-of-speech labels.

That is, the part-of-speech label sequence may be compared to the preset label sequence, acquiring the comparison result, as follows.

Part-of-speech labels contained in the part-of-speech label sequence may be sequentially pushed into a stack.

When a part-of-speech label is pushed into the stack, a part-of-speech label subsequence formed by each part-of-speech label in the stack may be compared to the preset label sequence, acquiring the comparison result.

Here, a stack structure is introduced to handle the legitimacy detection step.

Due to first-in-and-last-out characteristic of stack data processing, respective part-of-speech labels in the part-of-speech label sequence may be pushed into the stack one by one, and comparison may be performed for each one. A label causing illegitimacy may be ejected out of the stack, corrected, and then pushed back in. In this way, the part-of-speech label sequence output by the stack in the end may not only allow accurate labelling, but also be arranged in the correct order, without having to be arranged again.

The part-of-speech labels contained in the part-of-speech label sequence may be pushed sequentially into the stack as follows.

A part-of-speech label causing the current part-of-speech label subsequence to be illegitimate may be ejected out of the stack. A corrected part-of-speech label may be pushed into the stack. The flow may continue by returning to the step of comparing, to the preset label sequence, the part-of-speech label subsequence formed by the each part-of-speech label in the stack.

Take the text data being "Beijing is the capital of China" as an example, acquiring a label sequence of: Beijing/ns is/v capital/n of/u China/ns. Then the part-of-speech labels included in the sequence may be pushed into the stack sequentially. First, "Beijing/ns" is pushed in, and compared to the illegitimate sequence. If the comparison result indicates that it is different from any label appearing in the illegitimate sequence, it is deemed that the label "Beijing/ns" is correct. In this case, "is/v" may be pushed into the stack and the resulting sequence is compared to the illegitimate sequence. If the comparison result indicates that it is identical to labels appearing in the illegitimate sequence, It is deemed that the label "is/v" is incorrect. In this case, "is/v" is ejected out of the stack and corrected, acquiring a corrected part-of-speech label. The corrected part-of-speech label is again pushed into the stack, and the resulting sequence is again compared to the illegitimate sequence, so on and so forth.

Here, a part-of-speech label subsequence may include: the part-of-speech label corresponding to each word in the text data, i.e., "is/v" being a part-of-speech label subsequence; or, a sequence of part-of-speech labels of multiple words in the stack, i.e., "Beijing/ns is/v" forming a part-of-speech label subsequence.

In some examples, when there are multiple part-of-speech labels in the stack, each of the part-of-speech labels may be compared separately, or the part-of-speech label subsequence formed by all part-of-speech labels in the stack may be compared.

Take the text data "Beijing is the capital of China" as an example. As the words are pushed into the stack one by one, when comparison is performed for the label "Beijing/ns" in the stack, and the label is ok, "is/v" may be pushed in, and then comparison may be performed for "is/v" per se, or the part-of-speech label subsequence composed of "Beijing/ns is/v" may be compared to the illegitimate sequence.

In this way, with the help of the stack structure, the detection process may be made easier, facilitating quicker acquisition of a more accurate result of part-of-speech labelling.

In some examples, the detection result indicating whether the part-of-speech label sequence is legitimate may be acquired according to the comparison result, as follows.

A detection result indicating that the part-of-speech label sequence is legitimate may be acquired when each part-of-speech label subsequence acquired by pushing the part-of-speech labels in the part-of-speech label sequence into the stack is legitimate.

Here, legitimacy detection may be performed on each part-of-speech label subsequence pushed into the stack. If the each part-of-speech label subsequence is legitimate, an output detection result indicating legitimacy of the part-of-speech label sequence is that: the part-of-speech label sequence is legitimate.

In some examples, when the detection result indicates that the part-of-speech label sequence is illegitimate, the part-of-speech label sequence may be corrected as follows.

When the comparison result indicates that a current part-of-speech label subsequence is illegitimate, part-of-speech label correction may be performed on the current part-of-speech label subsequence.

Here, when the comparison result indicates that a current part-of-speech label subsequence is illegitimate, part-of-speech label correction may have to be performed on the current part-of-speech label subsequence.

The part-of-speech label sequence may be corrected as follows.

The part-of-speech label sequence may be corrected according to a transition probability indicating an inter-parts-of-speech conversion relation.

In examples of the present disclosure, a transition probability refers to the probability of the transition that may occur between words in a sentence, and indicates an inter-parts-of-speech conversion relation.

For example, in a sentence, a noun is usually followed by a verb, an adverb, etc., and it is unlikely that a noun would be followed by another noun. Therefore, the probability of noun-to-noun transition is low. Then, a part-of-speech label corresponding to the greatest transition probability may be selected as the resulting corrected label of the word under consideration.

Take text data "Beijing is the capital of China" as an example. If the text data are labelled as: Beijing/ns is/ns capital/n of/u China/ns, then a noun is followed by another noun, which transition is of low probability. The "is" should not be labelled as a noun. In this case, one may perform correction on "is" by finding the label corresponding to the maximum transition probability from a noun, as the label (i.e., part-of-speech label) for "is", changing the part-of-speech label for "is" from "ns" to "v".

It should be noted that the transition probability of each part-of-speech label may be determined based on the corpus herein. That is, a corpus containing a large amount of text may be preset, and the transition probability for each part-of-speech label may be determined by analyzing each sentence in the corpus.

For example, some sentences are composed of a subject, a predicate, and an object. The subject is a noun, the predicate is a verb, and the object is a noun. Then the probability of transition from the subject in the sentence to another part-of-speech label may be computed. Here, the probability of transition from the nominal subject to a noun is 0 or close to 0. If in the corpus, transition from a nominal subject to a verb is the most probable, then the word following the nominal subject is deemed to be a verb, that is, the part-of-speech label of the word is v. Then, the part-of-speech label of the word may be corrected as "v".

In this way, by correcting the part-of-speech label sequence based on a transition probability indicating an inter-parts-of-speech conversion relation, a part-of-speech label as accurate as possible may be acquired by correction, which helps improve accuracy of an output result of part-of-speech labelling.

The present disclosure also provides examples as follows.

In natural language processing based on deep learning, there are many classic models of part-of-speech labelling, such as the BiLSTM+CRF model or the BiLSTM+Softmax model.

In the BiLSTM+CRF model, both an emission probability and a transition probability are input to a CRF network. In the CRF network, correction is performed for an illegitimate situation in a labelling result. In this way, on one hand, a global optimal labelling result may be acquired by CRF-based decoding. On the other hand, CRF may correct some illegitimate situations in the emission probability. However, in this mode, although some illegitimate labelling situations may be effectively corrected globally to acquire a fair labelling result, the decoding process takes a lot of time. For example, assuming that the length of the sequence output by the model is n and the number of part-of-speech labels is l, the decoding time complexity is $O(l*n^2)$, which is high. Meanwhile, in a large-scale labelling scene, a labelling speed is critical.

Examples of the present disclosure may be implemented based on BiLSTM+Softmax, as follows.

First, the probability of a word in the text data with respect to each part-of-speech label may be acquired based on the BiLSTM model. Using Softmax, the part-of-speech label corresponding to the maximum probability is taken as the part-of-speech label corresponding to the word. Then, a part-of-speech label sequence may be acquired based on the order of the words. Further, the legitimacy of the part-of-speech label sequence may be verified. In this way, the computation is simple and the labelling is fast. Compared to the case using a subsequent CRF as the decoding network, the processing speed is increased by more than 10 times, meeting a scene of large-scale high-precision text labelling, well solving illegitimacy during part-of-speech labelling, improving labelling precision.

Figure 3:
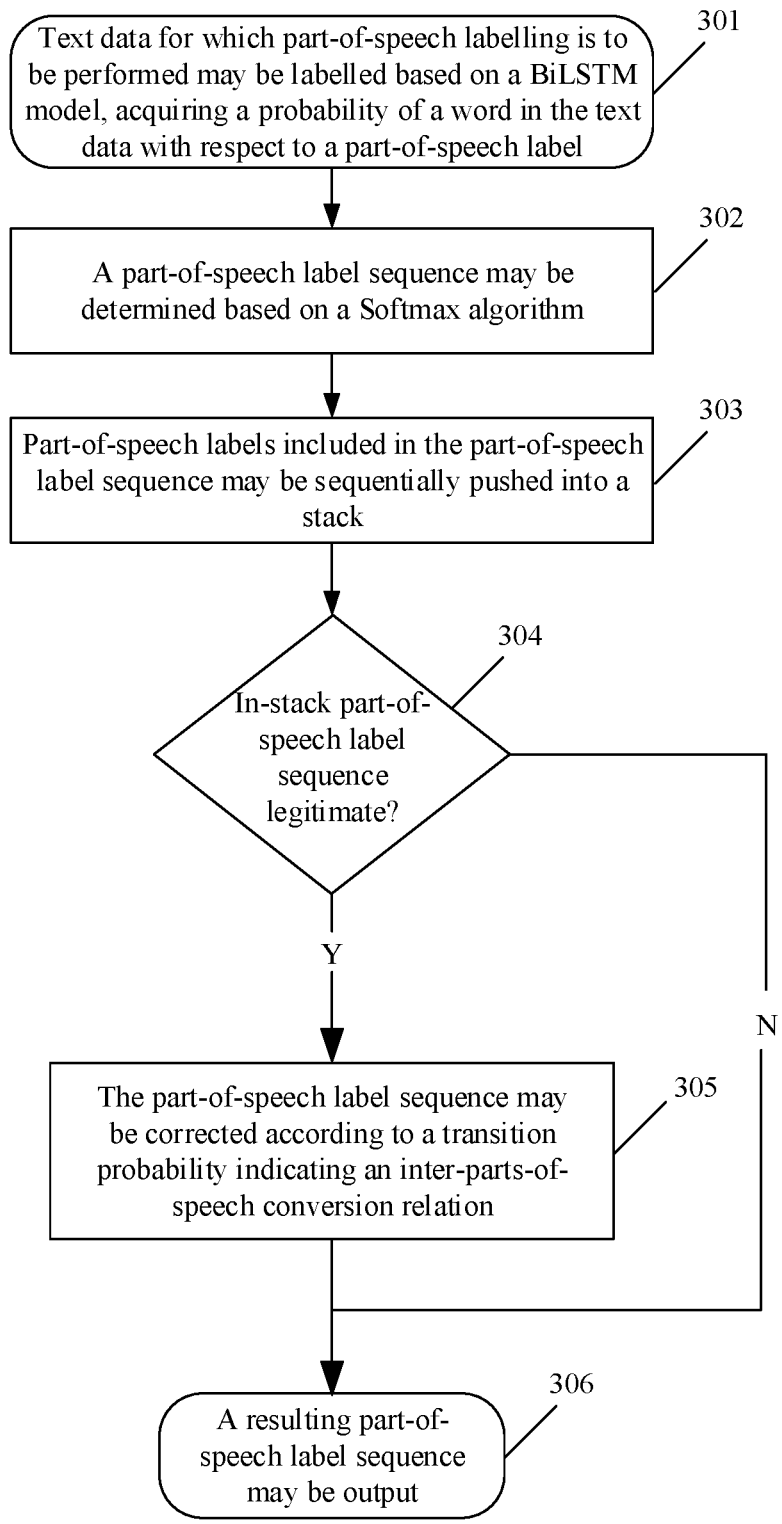
FIG. 3 is a flowchart of a method for semantic analysis based on BiLSTM+Softmax according to an illustrative example.

FIG. 3 is a flowchart of a method for semantic analysis based on BiLSTM+Softmax according to an illustrative example. As shown in FIG. 3, the method for semantic analysis includes a step as follows.

In S301, text data for which part-of-speech labelling is to be performed may be labelled based on a BiLSTM model, acquiring a probability of a word in the text data with respect to a part-of-speech label.

The probability acquired here is an emission probability.

In S302, a part-of-speech label sequence may be determined based on a Softmax algorithm.

Here, based on the Softmax algorithm, of the multiple probabilities, the part-of-speech label corresponding to the maximum probability of a word may be determined as the part-of-speech label of the word.

In S303, part-of-speech labels included in the part-of-speech label sequence may be sequentially pushed into a stack.

In S304, legitimacy of a part-of-speech label sequence in the stack may be detected, acquiring a detection result.

A pseudo code for stack detection may be as shown in FIG. 4. In FIG. 4, the isIllegalStart function is used to indicate whether a starting label sequence is legitimate, and corresponds to the illegitimate situation (1). The isIllegal function is used to indicate whether the existing part-of-speech label subsequence currently in the stack is legitimate. The transitionProbabilityAdjust function is used to adjust the illegitimate sequence currently in the stack, corresponding to the illegitimate situations (2) and (3).

Specifically, when an illegitimate part-of-speech label, denoted by array(i), appears, it is determined, based on a transition probability, that array(i−1) corresponds to a part-of-speech label with the greatest transition probability, and is pushed into the stack for illegitimacy detection.

If the detection result is yes, the flow may go to S305. Otherwise if the detection result is no, the flow may go to S306.

Here, the detection result of Yes indicates that there is an illegitimate situation in the part-of-speech label sequence, and the detection result of No indicates that there is no illegitimate situation in the part-of-speech label sequence.

In S305, the part-of-speech label sequence may be corrected according to a transition probability indicating an inter-parts-of-speech conversion relation.

In S306, a resulting part-of-speech label sequence may be output.

With the method for semantic analysis provided by examples of the present disclosure, legitimacy detection is performed on an acquired part-of-speech label sequence of text data for which part-of-speech labelling is to be performed. An illegitimate part-of-speech label sequence is corrected and output as a result of part-of-speech labelling. In this way, since the legitimacy of the part-of-speech label sequence is verified before outputting the part-of-speech labelling result, correction may be performed upon finding an illegitimate situation, improving accuracy of an output result of part-of-speech labelling.

Figure 5:
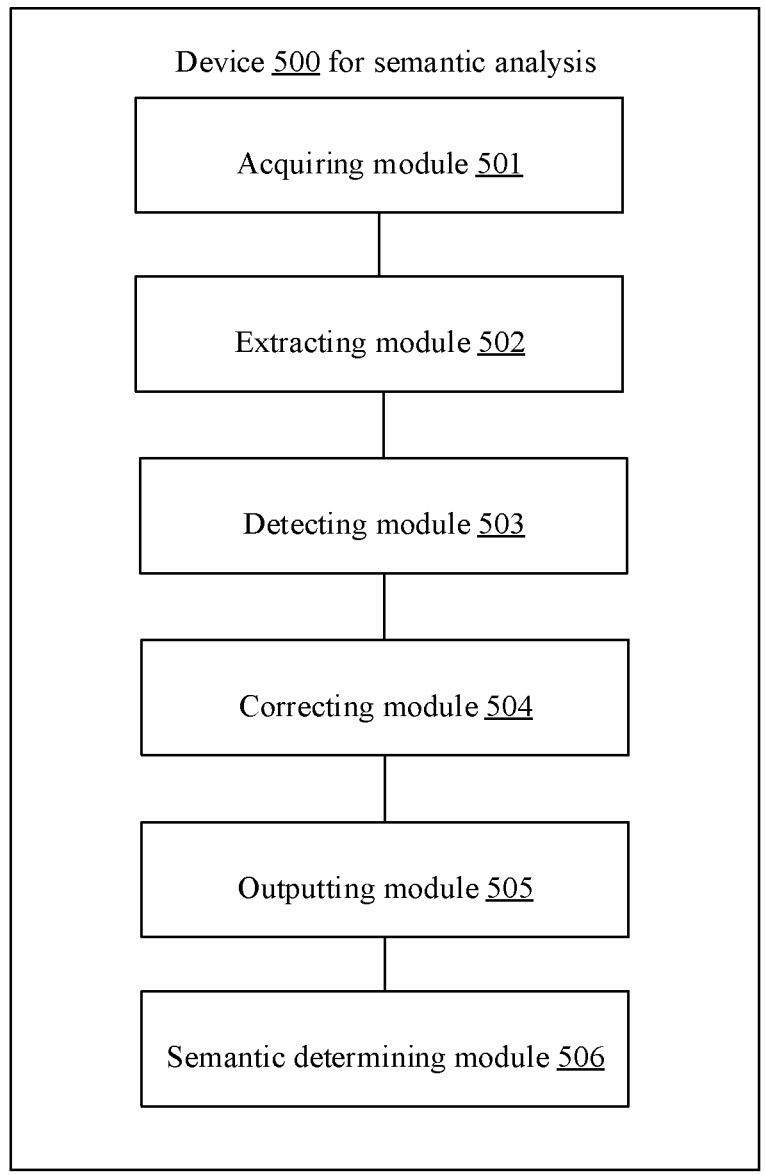
FIG. 5 is an illustrative diagram of a structure of a device for semantic analysis according to an illustrative example.

The present disclosure also provides a device for semantic analysis. FIG. 5 is an illustrative diagram of a structure of a device for semantic analysis according to an illustrative example. As shown in FIG. 5, the device 500 for semantic analysis includes a module as follow.

The acquiring module 501 is configured to acquire sentence information received by the terminal equipment.

The extracting module 502 is configured to extract a part-of-speech label sequence of text data in the sentence information for which part-of-speech labelling is to be performed.

The detecting module 503 is configured to acquire a detection result by detecting legitimacy of the part-of-speech label sequence.

The correcting module 504 is configured to, in response to the detection result indicating that the part-of-speech label sequence is illegitimate, correct the part-of-speech label sequence.

The outputting module 505 is configured to output a corrected part-of-speech label sequence as a result of performing part-of-speech labelling on the text data.

The semantic determining module 506 is configured to determine semantics corresponding to the sentence information according to output sentence information with part-of-speech labels.

In some examples, the detecting module includes a comparing module and a result acquiring module.

The comparing module may be configured to compare the part-of-speech label sequence with a preset label sequence, acquiring a comparison result. The preset label sequence may be an illegitimate sequence of part-of-speech labels.

The result acquiring module may be configured to acquire, according to the comparison result, the detection result indicating whether the part-of-speech label sequence is legitimate.

In some examples, the comparing module includes a stacking module and a comparing sub-module.

The stacking module may be configured to sequentially push part-of-speech labels contained in the part-of-speech label sequence into a stack.

The comparing sub-module may be configured to, in response to a part-of-speech label being pushed into the stack, compare, to the preset label sequence, a part-of-speech label subsequence formed by each part-of-speech label in the stack, acquiring the comparison result.

In some examples, the result acquiring module is further configured to:

in response to that each part-of-speech label subsequence acquired by pushing the part-of-speech labels in the part-of-speech label sequence into the stack is legitimate, acquire a detection result indicating that the part-of-speech label sequence is legitimate.

In some examples, the correcting module further includes a correcting sub-module.

The correcting sub-module may be configured to, in response to the comparison result indicating that a current part-of-speech label subsequence is illegitimate, perform part-of-speech label correction on the current part-of-speech label subsequence.

The stacking module may be further configured to perform:

ejecting, out of the stack, a part-of-speech label causing the current part-of-speech label subsequence to be illegitimate, pushing a corrected part-of-speech label into the stack, and continuing by comparing, to the preset label sequence, the part-of-speech label subsequence formed by the each part-of-speech label in the stack.

In some examples, the correcting sub-module is further configured to correct the part-of-speech label sequence according to a transition probability indicating an inter-parts-of-speech conversion relation.

In some examples, the extracting module includes an emission probability determining module and a part-of-speech label sequence acquiring module.

The emission probability determining module may be configured to perform, based on a preset extraction model, feature extraction on each word contained in the text data, acquiring an emission probability of the each word with respect to each part-of-speech label.

The part-of-speech label sequence acquiring module configured to acquire the part-of-speech label sequence of the text data according to the emission probability and an order in which the each word in the text data is arranged.

A module of the device according to an aforementioned example herein may perform an operation in a mode elaborated in an aforementioned example of the method herein, which will not be repeated here.

Figure 6:
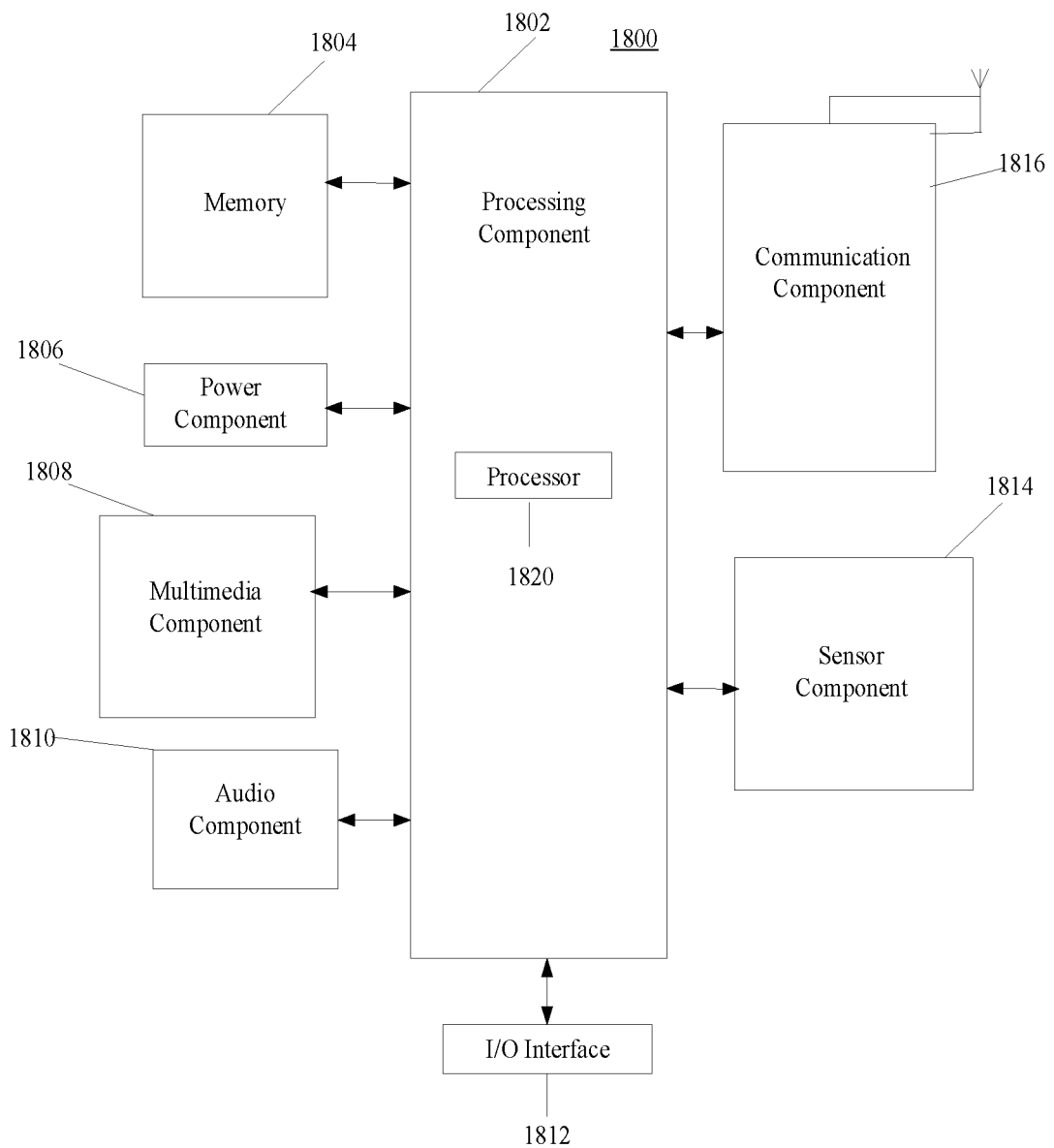
FIG. 6 is a block diagram of a device for semantic analysis according to an illustrative example.

FIG. 6 is a block diagram of a device 1800 for semantic analysis according to an illustrative example. For example, the device 1800 may be a terminal such as a mobile phone, a computer, a digital broadcasting terminal, messaging equipment, a game console, tablet equipment, medical equipment, fitness equipment, a Personal Digital Assistant (PDA), etc.

Referring to FIG. 6, the device 1800 may include one or more components as follows: a processing component 1802, a memory 1804, a power component 1806, a multimedia component 1808, an audio component 1810, an Input/Output (I/O) interface 1812, a sensor component 1814, and a communication component 1816.

The processing component 1802 generally controls an overall operation of the display equipment, such as operations associated with display, a telephone call, data communication, a camera operation, a recording operation, etc. The processing component 1802 may include one or more processors 1820 to execute instructions so as to complete all or some steps of the method. In addition, the processing component 1802 may include one or more modules to facilitate interaction between the processing component 1802 and other components. For example, the processing component 1802 may include a multimedia module to facilitate interaction between the multimedia component 1808 and the processing component 1802.

The memory 1804 is configured to store various types of data to support operation on the device 1800. Examples of these data include instructions of any application or method configured to operate on the device 1800, contact data, phonebook data, messages, pictures, videos, and/or the like. The memory 1804 may be realized by any type of volatile or non-volatile storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 1806 supplies electric power to various components of the device 1800. The power component 1806 may include a power management system, one or more power supplies, and other components related to generating, managing and distributing electric power for the device 1800.

The multimedia component 1808 includes a screen providing an output interface between the device 1800 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some examples, the multimedia component 1808 includes a front camera and/or a rear camera. When the device 1800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 1810 is configured to output and/or input an audio signal. For example, the audio component 1810 includes a microphone (MIC). When the device 1800 is in an operation mode such as a call mode, a recording mode, and a voice recognition mode, the MIC is configured to receive an external audio signal. The received audio signal may be further stored in the memory 1804 or may be sent via the communication component 1816. In some examples, the audio component 1810 further includes a loudspeaker configured to output the audio signal.

The I/O interface 1812 provides an interface between the processing component 1802 and a peripheral interface module. The peripheral interface module may be a keypad, a click wheel, a button or the like. These buttons may include but are not limited to: a homepage button, a volume button, a start button, and a lock button.

The sensor component 1814 includes one or more sensors for assessing various states of the device 1800. For example, the sensor component 1814 may detect an on/off state of the device 1800 and relative locationing of components such as the display and the keypad of the device 1800. The sensor component 1814 may further detect a change in the location of the device 1800 or of a component of the device 1800, whether there is contact between the device 1800 and a user, the orientation or acceleration/deceleration of the device 1800, and a change in the temperature of the device 1800. The sensor component 1814 may include a proximity sensor configured to detect existence of a nearby object without physical contact. The sensor component 1814 may further include an optical sensor such as a Complementary Metal-Oxide-Semiconductor (CMOS) or Charge-Coupled-Device (CCD) image sensor used in an imaging application. In some examples, the sensor component 1814 may further include an acceleration sensor, a gyroscope sensor, a magnetic sensor, a pressure sensor, or a temperature sensor.

The communication component 1816 is configured to facilitate wired or wireless/radio communication between the device 1800 and other equipment. The device 1800 may access a radio network based on a communication standard such as WiFi, 2G, 3G, . . . , or a combination thereof. In an example, the communication component 1816 broadcasts related information or receives a broadcast signal from an external broadcast management system via a broadcast channel. In an example, the communication component 1816 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an example, the device 1800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an example, a transitory or non-transitory computer-readable storage medium including instructions, such as the memory 1804 including instructions, is further provided. The instructions may be executed by the processor 1820 of the device 1800 to implement the method. For example, the non-transitory computer-readable storage medium may be a Read-Only Memory (ROM), a Random Access Memory (RAM), a Compact Disc Read-Only Memory (CD-ROM), a magnetic tape, a floppy disk, optical data storage equipment, etc.

A non-transitory computer-readable storage medium has stored therein instructions which, when executed by a processor, implement a method herein.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the examples are intended to be exemplary only.

It should be understood that the present disclosure is not limited to the exact construction that has been described above and illustrated in the accompanying drawings, and that various modifications and changes may be made to the present disclosure without departing from the scope of the present disclosure.

What is claimed is:

1. A method for semantic analysis, applied to terminal equipment, comprising:
   recognizing, by the terminal equipment, voice signals from a user to acquire sentence information received by the terminal equipment;
   extracting a part-of-speech label sequence of text data in the sentence information for which part-of-speech labelling is to be performed by
   performing, based on a preset extraction model, feature extraction on each word contained in the text data to acquire an emission probability of each word with respect to each part-of-speech label; and
   acquiring the part-of-speech label sequence of the text data according to the emission probability and an order in which each word in the text data is arranged, wherein the preset extraction model comprises at least one of a Hidden Markov Model (HMM), a Long Short-Term Memory (LSTM) a maximum entropy model, or a decision-tree-based model, and the preset extraction model comprises a feature extractor and a decoder;
   acquiring a detection result by detecting legitimacy of the part-of-speech label sequence;
   in response to the detection result indicating that the part-of-speech label sequence is illegitimate, correcting the part-of-speech label sequence by correcting the part-of-speech label sequence according to a transition probability indicating an inter-parts-of-speech conversion relation, wherein the transition probability comprises a probability of transition occurring between words in the sentence information;
   outputting a corrected part-of-speech label sequence as a result of performing part-of-speech labelling on the text data;
   determining semantics corresponding to the sentence information according to output sentence information with part-of-speech labels; and
   providing, by the terminal equipment, an answer to the voice signals from the user according to the determined semantics.

2. The method of claim 1, wherein acquiring the detection result by detecting the legitimacy of the part-of-speech label sequence comprises:
   comparing the part-of-speech label sequence with a preset label sequence to acquire a comparison result, wherein the preset label sequence is an illegitimate sequence of part-of-speech labels; and
   acquiring, according to the comparison result, the detection result indicating whether the part-of-speech label sequence is legitimate.

3. The method of claim 2, wherein comparing the part-of-speech label sequence with the preset label sequence to acquire the comparison result comprises:
   sequentially pushing part-of-speech labels contained in the part-of-speech label sequence into a stack; and
   in response to a part-of-speech label being pushed into the stack, comparing, to the preset label sequence, a part-of-speech label subsequence formed by each part-of-speech label in the stack to acquire the comparison result.

4. The method of claim 3, wherein acquiring, according to the comparison result, the detection result indicating whether the part-of-speech label sequence is legitimate, comprises:
   in response to that each part-of-speech label subsequence acquired by pushing the part-of-speech labels in the part-of-speech label sequence into the stack is legitimate, acquiring a detection result indicating that the part-of-speech label sequence is legitimate.

5. The method of claim 3, wherein, in response to the detection result indicating that the part-of-speech label sequence is illegitimate, correcting the part-of-speech label sequence, comprises:
   in response to the comparison result indicating that a current part-of-speech label subsequence is illegitimate, performing part-of-speech label correction on the current part-of-speech label subsequence,
   wherein sequentially pushing the part-of-speech labels contained in the part-of-speech label sequence into the stack comprises:
   ejecting, out of the stack, a part-of-speech label causing the current part-of-speech label subsequence to be illegitimate, pushing a corrected part-of-speech label into the stack, and continuing by comparing, to the preset label sequence, the part-of-speech label subsequence formed by each part-of-speech label in the stack.

6. A device for semantic analysis, comprising:
   a processor and a memory for storing executable instructions executable on the processor, wherein the processor is configured to execute the executable instructions to perform:
   recognizing, by a terminal equipment, voice signals from a user to acquire sentence information received by the terminal equipment;

extracting a part-of-speech label sequence of text data in the sentence information for which part-of-speech labelling is to be performed by performing, based on a preset extraction model, feature extraction on each word contained in the text data to acquire an emission probability of each word with respect to each part-of-speech label; and acquiring the part-of-speech label sequence of the text data according to the emission probability and an order in which each word in the text data is arranged, wherein the preset extraction model comprises at least one of a Hidden Markov Model (HMM), a Long Short-Term Memory (LSTM) a maximum entropy model, or a decision-tree-based model, and the preset extraction model comprises a feature extractor and a decoder;

acquiring a detection result by detecting legitimacy of the part-of-speech label sequence;

in response to the detection result indicating that the part-of-speech label sequence is illegitimate, correcting the part-of-speech label sequence by correcting the part-of-speech label sequence according to a transition probability indicating an inter-parts-of-speech conversion relation, wherein the transition probability comprises a probability of transition occurring between words in the sentence information;

outputting a corrected part-of-speech label sequence as a result of performing part-of-speech labelling on the text data;

determining semantics corresponding to the sentence information according to output sentence information with part-of-speech labels; and providing, by the terminal equipment, an answer to the voice signals from the user according to the determined semantics.

7. The device of claim 6, wherein the processor is configured to acquire the detection result by detecting the legitimacy of the part-of-speech label sequence by:

comparing the part-of-speech label sequence with a preset label sequence to acquire a comparison result, wherein the preset label sequence is an illegitimate sequence of part-of-speech labels; and acquiring, according to the comparison result, the detection result indicating whether the part-of-speech label sequence is legitimate.

8. The device of claim 7, wherein the processor is configured to compare the part-of-speech label sequence with the preset label sequence to acquire the comparison result, by:

sequentially pushing part-of-speech labels contained in the part-of-speech label sequence into a stack; and in response to a part-of-speech label being pushed into the stack, comparing, to the preset label sequence, a part-of-speech label subsequence formed by each part-of-speech label in the stack to acquire the comparison result.

9. The device of claim 8, wherein the processor is configured to acquire, according to the comparison result, the detection result indicating whether the part-of-speech label sequence is legitimate, by:

in response to that each part-of-speech label subsequence acquired by pushing the part-of-speech labels in the part-of-speech label sequence into the stack is legitimate, acquiring a detection result indicating that the part-of-speech label sequence is legitimate.

10. The device of claim 8, the processor is configured to, in response to the detection result indicating that the part-of-speech label sequence is illegitimate, correct the part-of-speech label sequence, by:

in response to the comparison result indicating that a current part-of-speech label subsequence is illegitimate, performing part-of-speech label correction on the current part-of-speech label subsequence, wherein the processor is configured to sequentially push the part-of-speech labels contained in the part-of-speech label sequence into the stack by:

ejecting, out of the stack, a part-of-speech label causing the current part-of-speech label subsequence to be illegitimate, pushing a corrected part-of-speech label into the stack, and continuing by comparing, to the preset label sequence, the part-of-speech label subsequence formed by each part-of-speech label in the stack.

11. A non-transitory computer-readable storage medium having stored therein computer-executable instructions which, when executed by a processor, cause the processor to implement:

recognizing, by a terminal equipment, voice signals from a user to acquire sentence information received by the terminal equipment;

extracting a part-of-speech label sequence of text data in the sentence information for which part-of-speech labelling is to be performed by performing, based on a preset extraction model, feature extraction on each word contained in the text data to acquire an emission probability of each word with respect to each part-of-speech label; and acquiring the part-of-speech label sequence of the text data according to the emission probability and an order in which each word in the text data is arranged, wherein the preset extraction model comprises at least one of a Hidden Markov Model (HMM), a Long Short-Term Memory (LSTM) a maximum entropy model, or a decision-tree-based model, and the preset extraction model comprises a feature extractor and a decoder;

acquiring a detection result by detecting legitimacy of the part-of-speech label sequence;

in response to the detection result indicating that the part-of-speech label sequence is illegitimate, correcting the part-of-speech label sequence by correcting the part-of-speech label sequence according to a transition probability indicating an inter-parts-of-speech conversion relation, wherein the transition probability comprises a probability of transition occurring between words in the sentence information;

outputting a corrected part-of-speech label sequence as a result of performing part-of-speech labelling on the text data;

determining semantics corresponding to the sentence information according to output sentence information with part-of-speech labels; and providing, by the terminal equipment, an answer to the voice signals from the user according to the determined semantics.

12. The storage medium of claim 11, wherein the instructions caused the processor to implement acquiring the detection result by detecting the legitimacy of the part-of-speech label sequence further cause the processor to implement:

comparing the part-of-speech label sequence with a preset label sequence to acquire a comparison result, wherein the preset label sequence is an illegitimate sequence of part-of-speech labels; and acquiring, according to the comparison result, the detection result indicating whether the part-of-speech label sequence is legitimate.

13. The storage medium of claim 12, wherein the instructions caused the processor to implement comparing the part-of-speech label sequence with the preset label sequence to acquire the comparison result further cause the processor to implement:
   sequentially pushing part-of-speech labels contained in the part-of-speech label sequence into a stack; and
   in response to a part-of-speech label being pushed into the stack, comparing, to the preset label sequence, a part-of-speech label subsequence formed by each part-of-speech label in the stack to acquire the comparison result.

14. The storage medium of claim 13, wherein the instructions caused the processor to implement acquiring, according to the comparison result, the detection result indicating whether the part-of-speech label sequence is legitimate, further cause the processor to implement:
   in response to that each part-of-speech label subsequence acquired by pushing the part-of-speech labels in the part-of-speech label sequence into the stack is legitimate, acquiring a detection result indicating that the part-of-speech label sequence is legitimate.

15. The storage medium of claim 13, wherein, the instructions caused the processor to implement, in response to the detection result indicating that the part-of-speech label sequence is illegitimate, correcting the part-of-speech label sequence, further cause the processor to implement:
   in response to the comparison result indicating that a current part-of-speech label subsequence is illegitimate, performing part-of-speech label correction on the current part-of-speech label subsequence,
   wherein sequentially pushing the part-of-speech labels contained in the part-of-speech label sequence into the stack comprises:
   ejecting, out of the stack, a part-of-speech label causing the current part-of-speech label subsequence to be illegitimate, pushing a corrected part-of-speech label into the stack, and continuing by comparing, to the preset label sequence, the part-of-speech label subsequence formed by the each part-of-speech label in the stack.

\* \* \* \* \*